June 19, 1934.  F. A. E. JENKINS  1,963,091
AUTOMOTIVE VEHICLE
Filed Nov. 16, 1932    9 Sheets-Sheet 6
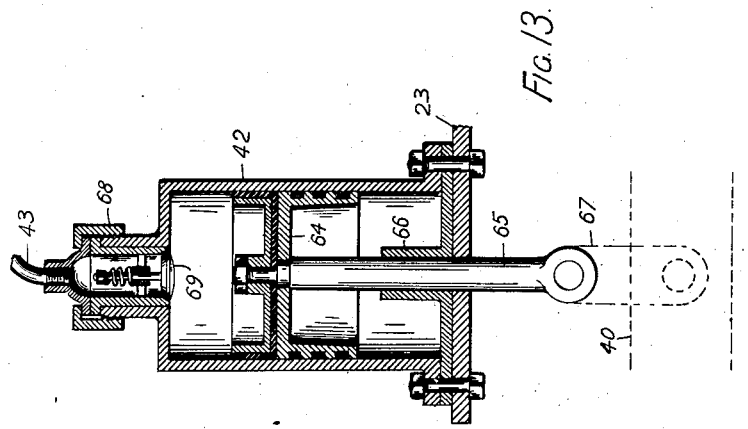
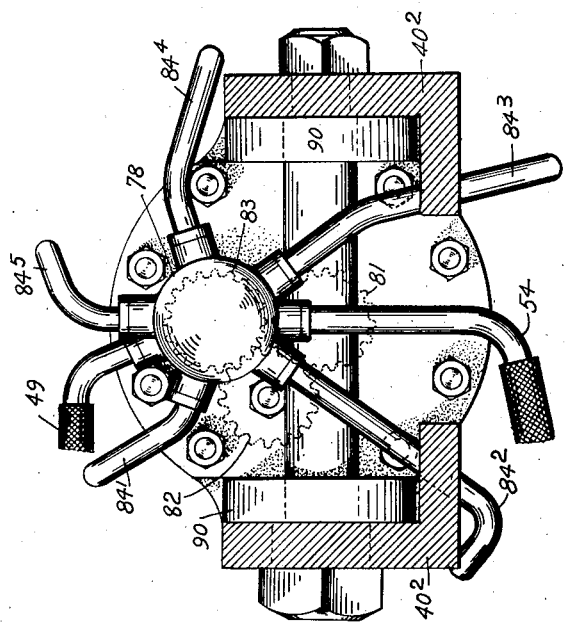
Inventor
Fredrick Alfred Edward Jenkins
By B. Singer, Atty.

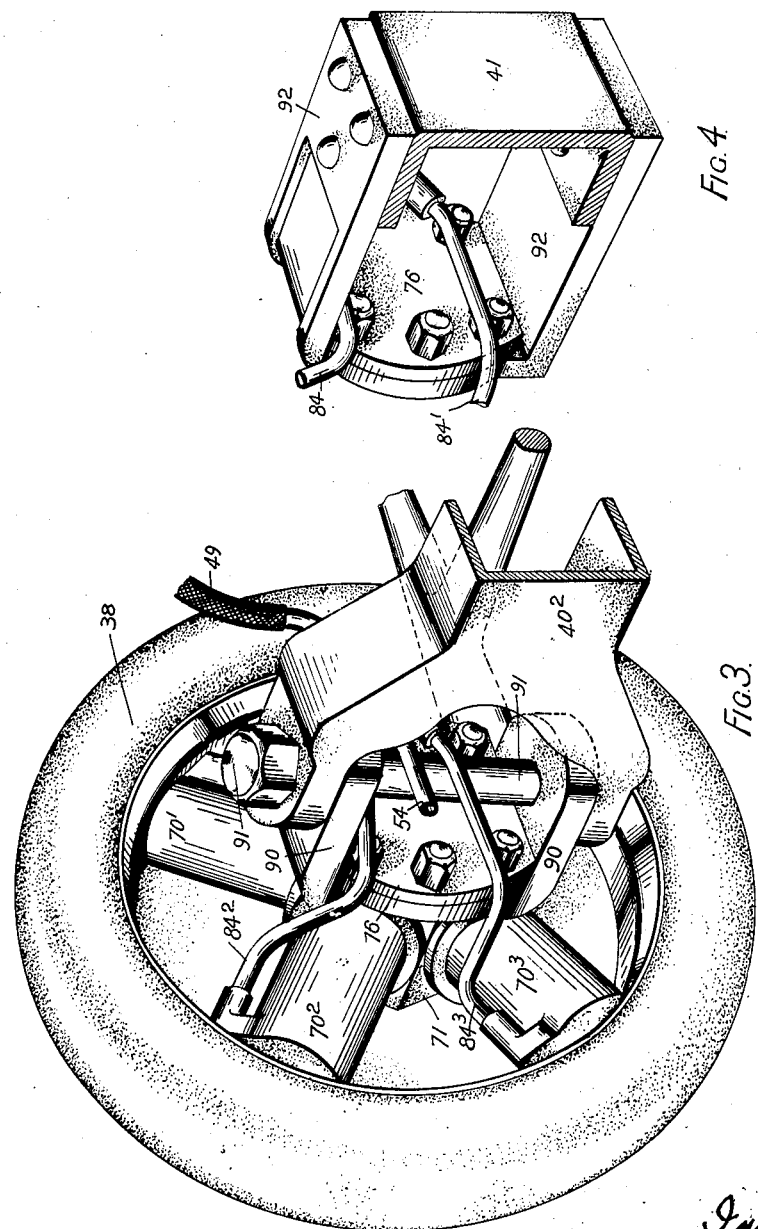

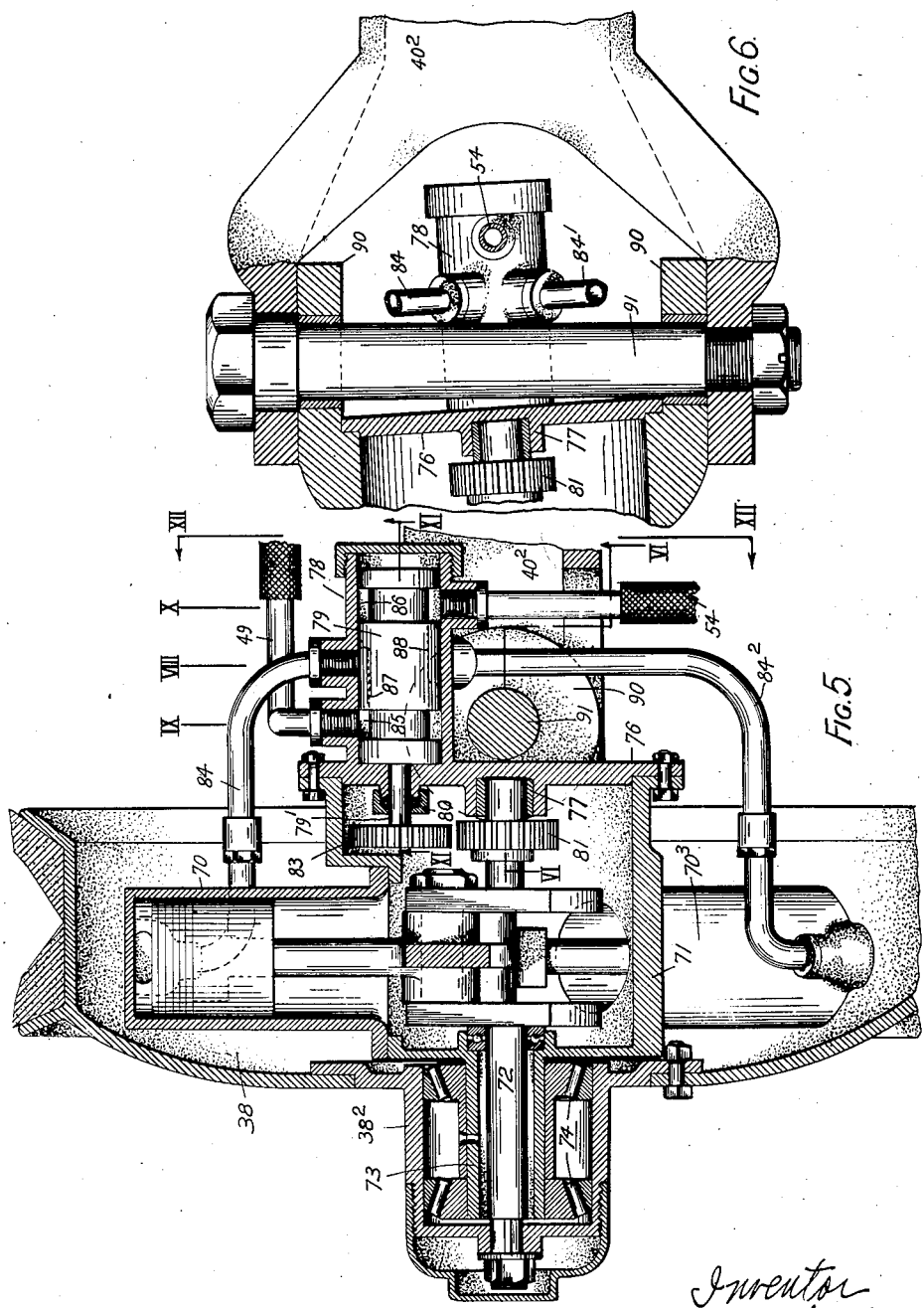

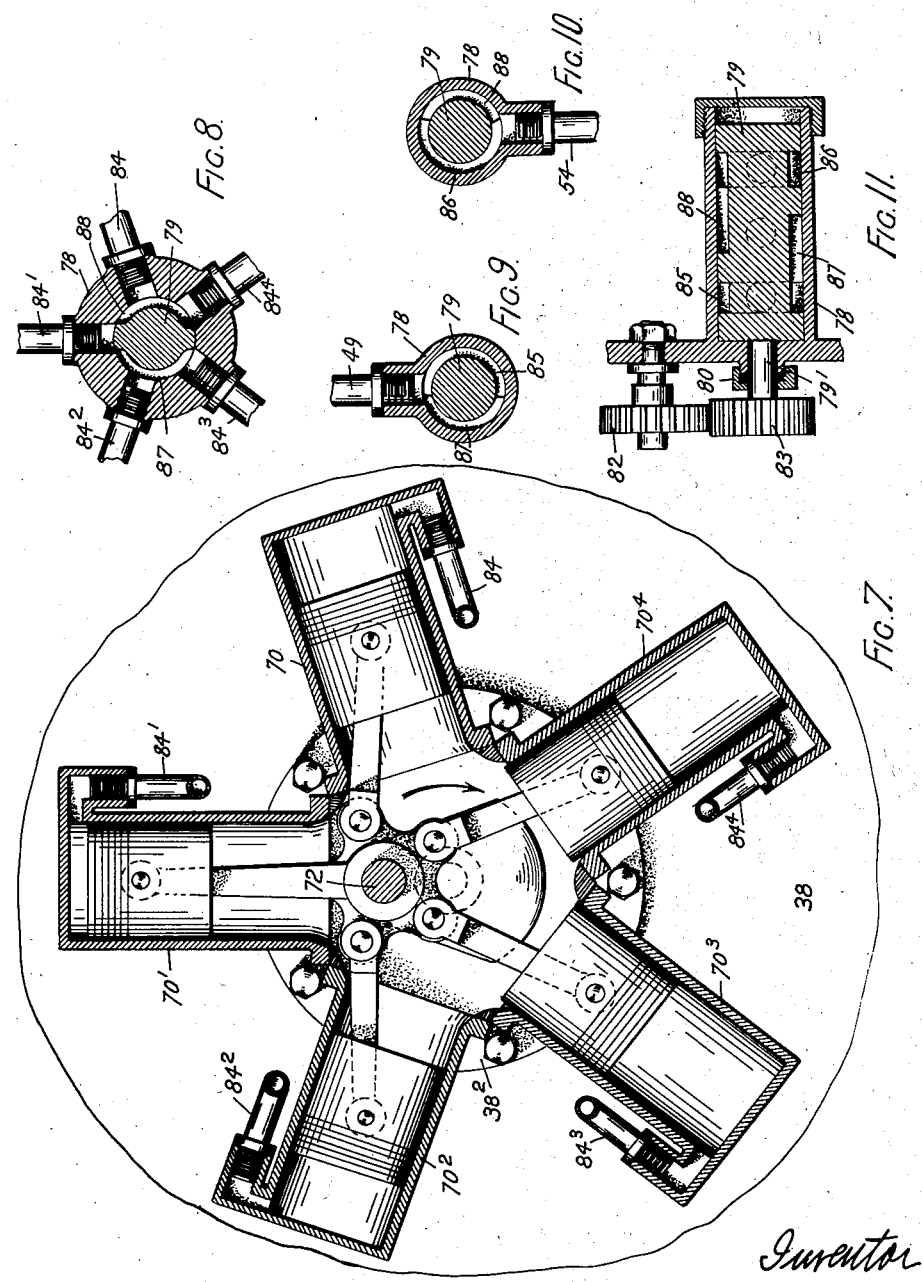

June 19, 1934.  F. A. E. JENKINS  1,963,091
AUTOMOTIVE VEHICLE
Filed Nov. 16, 1932   9 Sheets-Sheet 8
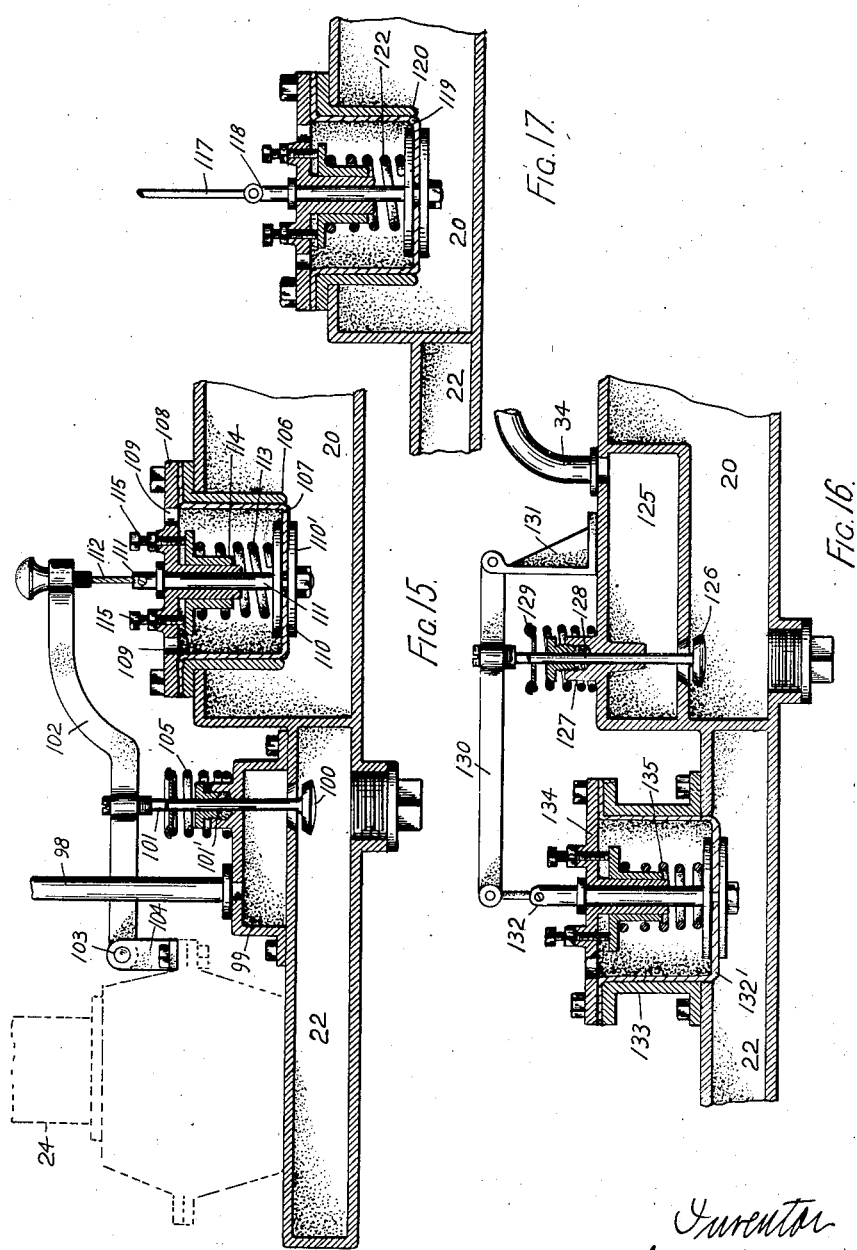
Inventor
Fredrick Alfred Edward Jenkins
By P. Singer, atty.

June 19, 1934.  F. A. E. JENKINS  1,963,091
AUTOMOTIVE VEHICLE
Filed Nov. 16, 1932   9 Sheets-Sheet 9
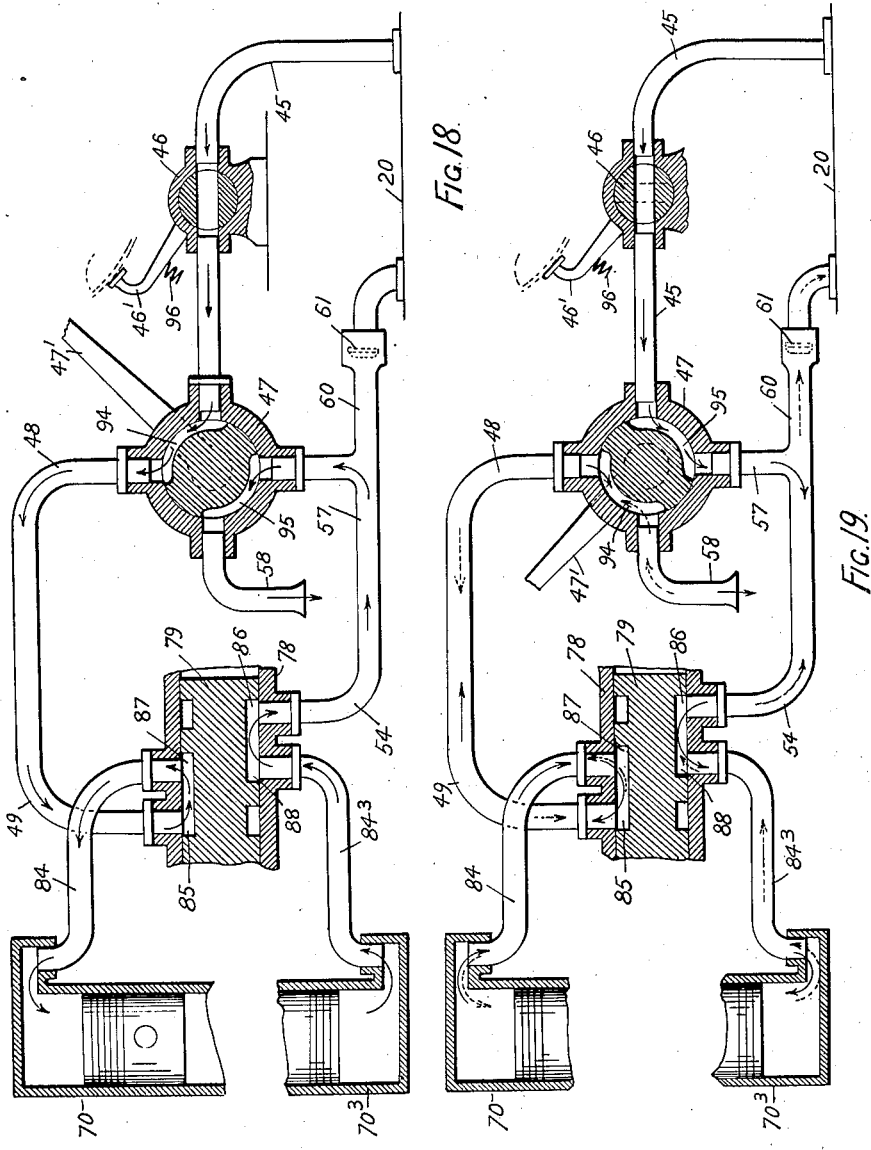

Patented June 19, 1934

1,963,091

UNITED STATES PATENT OFFICE 1,963,091

AUTOMOTIVE VEHICLE

Fredrick Alfred Edward Jenkins, Canterbury, near Sydney, New South Wales, Australia Application November 16, 1932, Serial No. 642,979
In Australia July 14, 1932

9 Claims. (Cl. 180—66)

This invention relates to the employment of compressed air as the propulsive medium of an automotive vehicle, and it consists in a novel construction of vehicle, a novel power installation, and, in combination with these, as applied to automobiles, novel means for applying power to one pair or both pairs of road wheels thus providing for a four wheel drive if desired.

One of the objects aimed at, is decreased constructional cost by the elimination of the usual transmission shaft, change speed gear, differential gear, rear axle and housing, front axle, usual springs, and various other elements of ordinary automobile construction. Another object is to provide an automobile of greater flexibility and greater economy in running than has hitherto been attained.

The invention in its broadcast aspect consists in a vehicle including an air-compressor unit, an air receiver constituting the chassis structure, road wheels on stub axles supported by resilient means attached to said chassis structure, air driven engines coupled to the wheels, one to each wheel to be driven, and means for controlling a supply of air from the receiver to the air engines for forward or reverse drive.

It is contemplated that the greatest economy will result from the employment of an air compressor unit operating on the Diesel principle, and an embodiment of the invention incorporating a compressor unit of that type also includes a high pressure receiver to contain air for starting purposes, means for charging said receiver (hereinafter called the starting tank) and means for controlling the supply of starting air and for automatically re-starting the compressor unit under certain conditions hereinafter explained. It is to be understood that a particular type of compressor is not essential to the invention and any suitable type may be employed, no particular type being claimed as part of this invention.

The invention also includes other features in regard to the air engines, spring suspension, and general construction all of which will be ascertained from the following description of the embodiment of the invention depicted in the accompanying drawings, the novel features and combinations being defined by the appended claims.

In the drawings,

Fig. 3 is a perspective view of a front wheel assembly including an air-engine associated therewith, and Fig. 4 is a perspective detail showing the method of mounting the engine of a rear wheel, the engine and wheel not being shown;

Fig. 5 is a sectional plan view of a front wheel assembly including an air engine with distributor valve, and Fig. 6 is a sectional elevation on line VI, VI of Fig. 5;

Fig. 7 is a sectional elevation of one of the air-engines.

Figs. 8, 9 and 10 are cross sections through the distributor valves on lines VIII, IX and X respectively of Fig. 5, and Fig. 11 is a longitudinal sectional elevation on line XI, XI of Fig. 5.

Fig. 12 is an end elevation partly in section of the distributor valve and associated parts taken on line XII, XII of Fig. 5.

Fig. 13 is a sectional elevation of a pneumatic cushioning device taking the place in part of the usual spring.

Fig. 15 is a sectional elevation on plane XV, XV of Fig. 14,

Fig. 16 is a similar view on plane XVI, XVI, of Fig. 14, and

Figure 14:
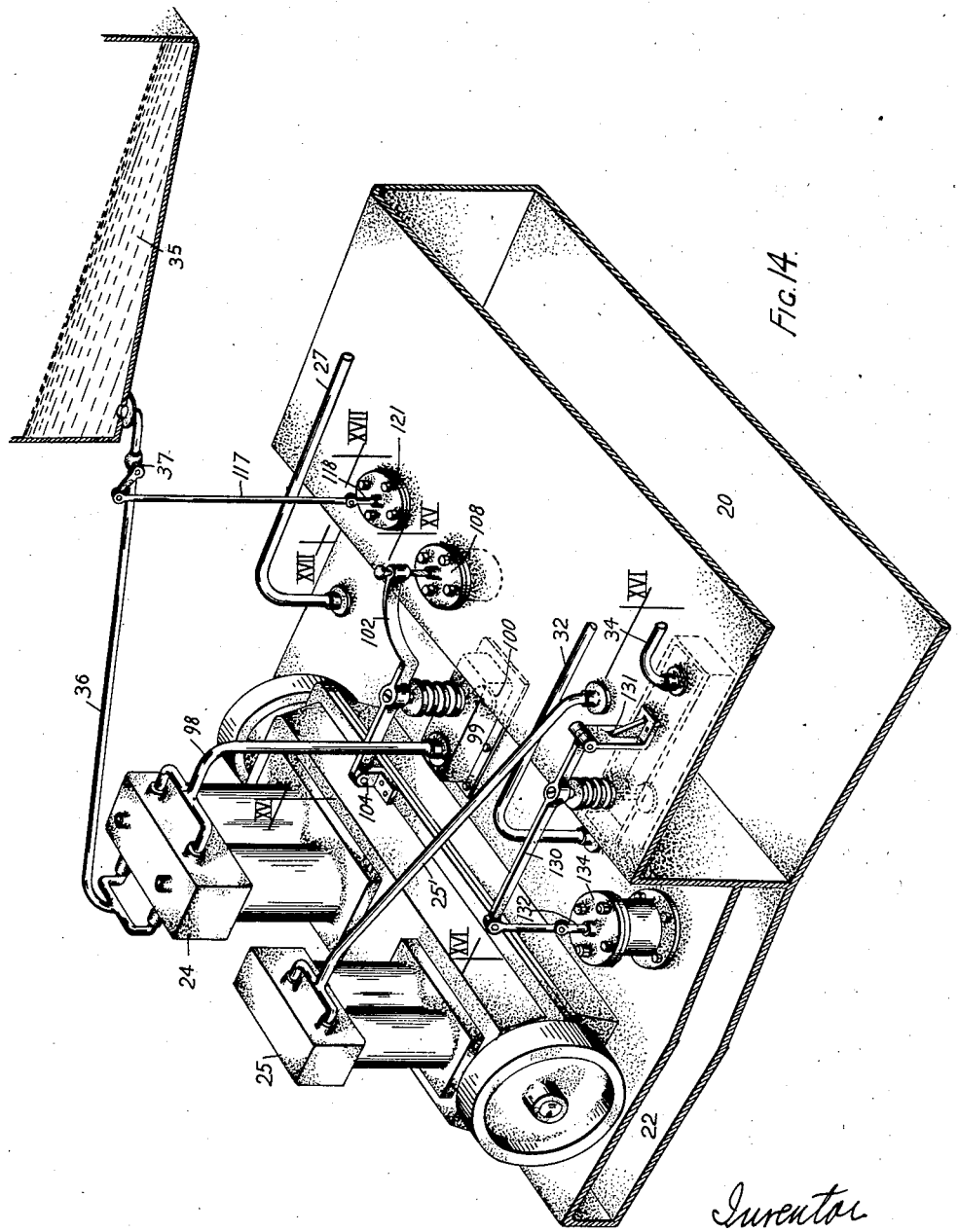
Fig. 14 is a perspective view, partly in section, of the front portion of the receiver and starting tank structure with the air compressor unit and its adjuncts.

Fig. 17 a similar view on plane XVII, XVII, of Fig. 14.

Fig. 18 is a diagrammatic view showing the relative disposition of valves and the flow of air from the receiver to an air-engine and thence to atmosphere when the engine is operating to propel the vehicle forwardly, and Fig. 19 is a similar view when the engine is reversed.

Figure 1:
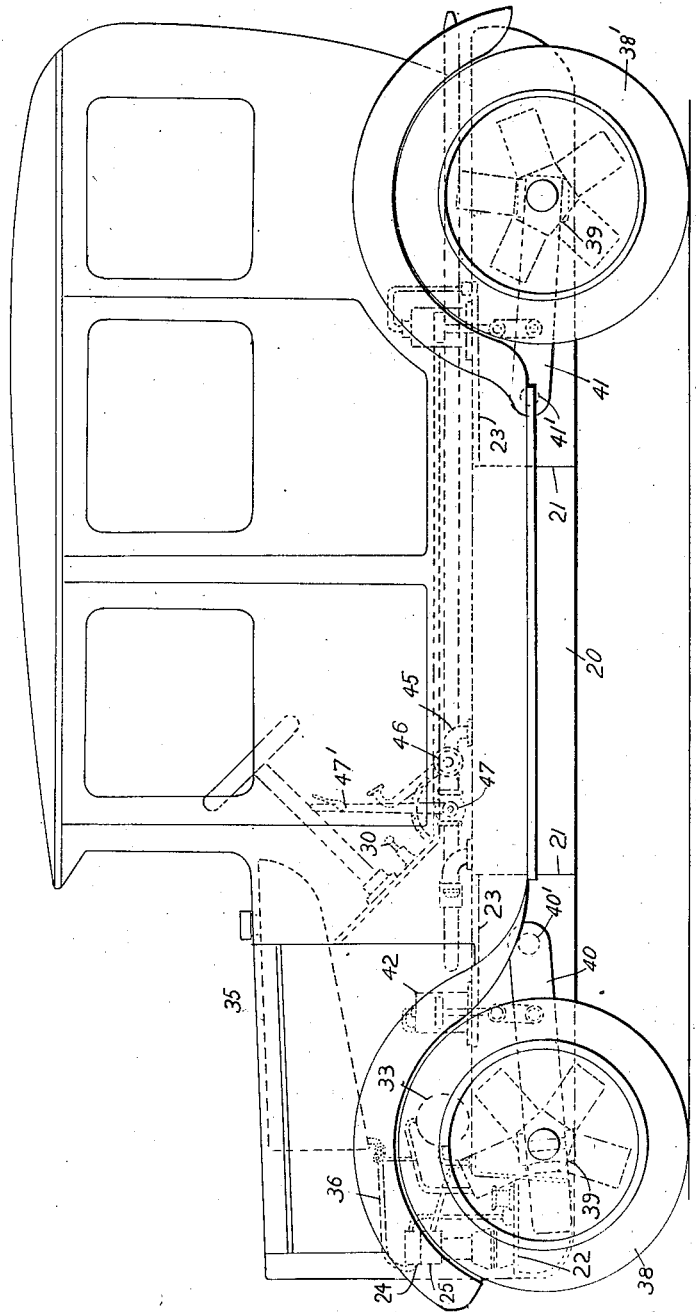
Fig. 1 is a diagrammatic side elevation of a motor vehicle embodying this invention.
Figure 2:
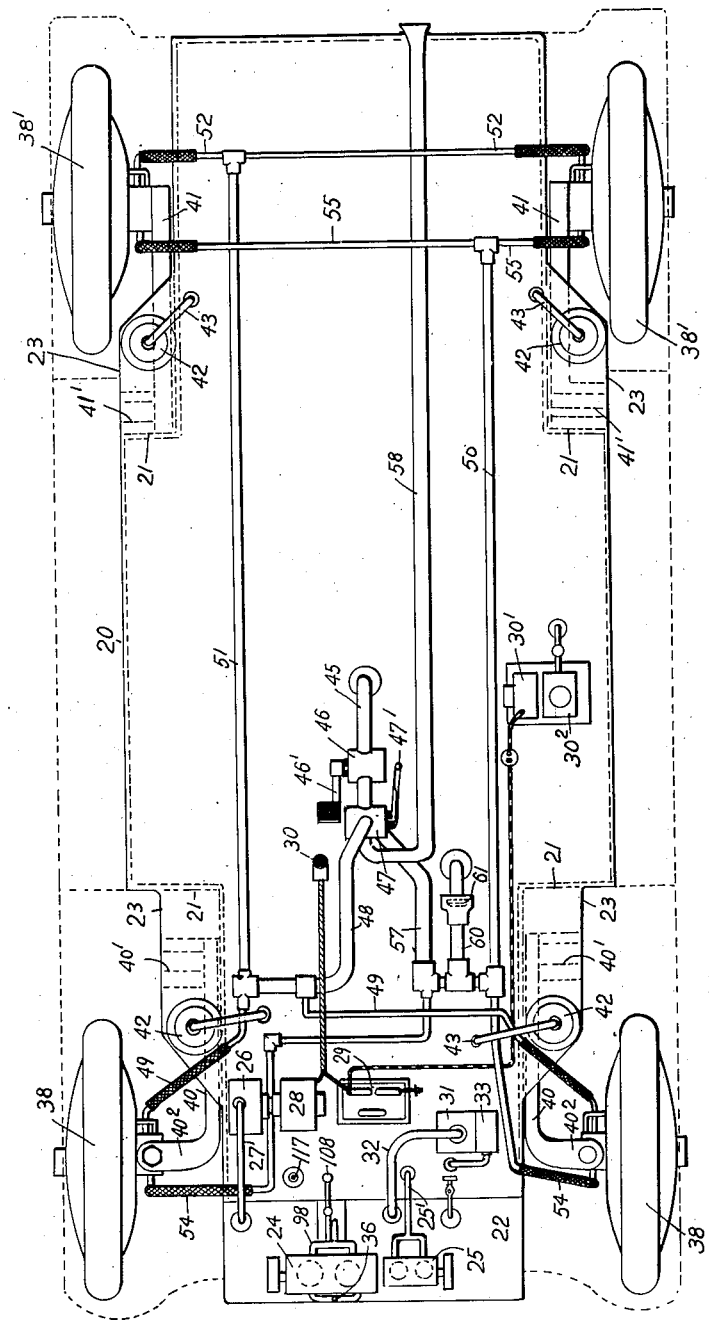
Fig. 2 is a plan view of the same with the superstructure removed.

Referring to Figs. 1 and 2, the chassis of the vehicle is constituted by or formed as an air-receiver 20 of the general shape shown, that is, its width at the front and rear ends is reduced, the side walls being inset as shown at 21, 21. In the front end there is provided a smaller reservoir or tank 22 to contain a supply of air at high pressure for use in starting the air-compressor unit, as hereinafter explained; this smaller reservoir is termed the starting tank.

In the angles between the inset walls 21, 21 and the side walls of the forward and rear portions of the receiver structure are web plates 23, 23 which besides having a bracing effect have another purpose to be described later.

The type of air compressor unit shown includes a twin cylinder Diesel type engine 24 and twin air compressing cylinders 25, all of known type and therefore not requiring further description. This compressor unit is mounted over the starting tank 22 as clearly shown in Fig. 14, and delivers air through pipe 25' to the receiver 20.

Associated with the compressor and starting tank are means for initially charging the starting tank, said means comprising an air pump 26 delivering through pipe 27 into the starting tank and driven by an electric motor 28 supplied with current from a battery 29 through a press switch 30. The battery is charged by a generator 30' driven by an air motor $30^2$ actuated as required by air from the receiver 20. There is also provided other means for automatically replenishing the starting tank should the pressure therein fall below a predetermined minimum. The last mentioned means comprise an air pump 31 delivering through pipe 32 and driven by an air-engine 33 supplied with air from the main receiver through pipe 34, the supply of air being automatically controlled (as hereinafter described) by the pressure in the starting tank.

Situated under the bonnet and scuttle is an oil-fuel tank 35 connected by a pipe 36 to the Diesel engine 24 in known manner, and in this pipe is a valve 37 controlled as hereinafter described.

The front wheels 38, which are swivel-mounted for steering purposes, and the rear wheels $38^1$ are mounted independently on the crank shafts of air-engines 39 housed within the wheel structures respectively, the engines themselves being fixedly mounted on the free ends of suspension arms pivoted to the walls of the air receiver and each independently movable in a vertical arc. The front pair of these arms is indicated by references 40, 40 and their pivots by 40', while the rear arms 41 are pivoted at 41'. Each arm is resiliently supported by a pneumatic cushioning device 42 mounted on a web plate 23 and supplied with air from the receiver 20 through pipe 43. The construction and operation of these devices will be explained hereinafter with reference to Fig. 13.

The air engines 39 are of known type, each comprising five radial cylinders fitted respectively with pistons coupled to a common crank shaft, and a rotary distributor valve gear-driven from the crank shaft and operating to supply air to the cylinders in succession for forward and reverse drive selectively. Details of the construction, operation and mounting of these engines will be hereinafter described with reference to Figs. 3 to 12 inclusive of the drawings, it being sufficient for the present to state that the engines are supplied with air from the receiver 20 through a pipe 45, (Fig. 2) rotary throttle valve 46 regulated by pedal lever 46' and normally closed by a spring 96 (see Figs. 18 and 19), rotary reversing valve 47, with reversing lever 47', manifold 48 (for forward drive), pipes 49 to the distributor valves of the front wheel engines respectively, and through manifold 48, pipe 51 and branches 52 to the distributor valves of the rear wheel engines. Exhaust air flows from the distributor valves of the front wheel engines through pipes 54, (and from the rear wheel engines through pipes 55, 56) manifold 57 and reversing valve 47 to main exhaust pipe 58. Should the vehicle be "coasting", the reversing valve 47 may be so adjusted that the engines act as pumps, drawing in air through the main exhaust 58 and delivering it through pipe 60, in which is a non-return valve 61, to the receiver 20 against the pressure therein, thus utilizing the engines as braking means.

The details of this air control arrangement will be later described with reference to Figs. 18 and 19 of the drawings. It will, however, be observed that portions of pipes 49, 52, 54 and 55 are of flexible construction as shown by cross-hatching.

Reference is now made to Fig. 13 depicting one of the pneumatic cushioning devices. This comprises a cylinder 42 flanged at its lower end and bolted to one of the web plates 23; within the cylinder is a piston 64 secured to a rod 65 passing through a guide 66 in the lower head of the cylinder and through the plate 23, being terminally connected to one end of a link 67 which at its other end is pivotally attached to one of the suspension arms 40 or 41 as the case may be. At the upper end of the cylinder is a valve chest 68 in which is a spring-loaded non-return valve 69 opening inwardly into the cylinder, and connected to the top of the valve chest is the pipe 43 in constant communication with the air receiver 20. Thus there is established at four points a constant cushion of air above the piston to resiliently support the vehicle body on the arms 40.

Reference is now made to Figs. 3 to 12 of the drawings. Each air-engine is of radial cylinder type, comprising five cylinders 70, 70', $70^2$, $70^3$ and $70^4$ respectively all mounted upon a common crank case 71, and fitted with pistons coupled to a common crank shaft 72 in known manner. At one end of the crank case is a hollow sleeve 73 through which passes one end of the crank shaft and which serves as a stub-axle on which the wheel 38 rotates. On the outer end of the shaft there is secured the hub $38^2$ of the wheel, and this hub rotates on roller bearings 74 located between its internal periphery and the external periphery of sleeve 73.

At the other end of the crank case is a coverplate 76 providing internally a bearing 77 for the crank shaft, and having externally the hollow shell or body 78 of the distributor valve which also comprises a parallel plug 79 fitting in said shell and having a spindle 79' which passes through a stuffing box 80 into the crank case. The plug is rotated synchronously with the crank shaft through the instrumentality of a gear train comprising a pinion 81 on the crank shaft, an idler wheel 82 (see Figs. 12 and 11) and a pinion 83 on the spindle 79'.

In the case of a front wheel engine as shown in Figs. 5 and 12, the air supply pipe 49 is connected to the distributor valve near one end of the shell 78 and the exhaust pipe 54 near the other end, and between these connections there is a ring of five port-openings to which are connected five pipes 84, 84', $84^2$, $84^3$, and $84^4$ (see Figs. 8 and 7) leading respectively to the engine cylinders. The plug 79 of the distributor valve has two annular passages 85 and 86 in register respectively with the connections of pipes 49 and 54, and oppositely disposed longitudinal passages 87 and 88 (see Figs. 18 and 19) communicating respectively with annular passages 85 and 86 and so arranged that as the plug rotates pipe 49 is placed in communication with pipes 84, 84', $84^2$, $84^3$, and $84^4$ successively, and the last mentioned pipes in alternating succession with pipe 54.

Each front wheel engine has, integral with the crank case, a pair of lugs 90 which with the forked and cranked end 40² of the suspension arm 40 and with king pin 91, constitute the steering knuckle. This construction is clearly shown in Figs. 3 and 6.

Similarly (see Fig. 4) the crank case of each rear wheel engine has lugs 92 which are rigidly secured to one of the straight suspension arms 41.

The control of the motive power of the vehicle is best described by reference to Figs. 18 and 19. Assuming that it is desired to propel the vehicle in a forward direction, the reversing valve 47 is set to the position shown in Fig. 18; on the throttle valve 46 being opened by foot pressure, air from the receiver 20 flows as indicated by the arrows through pipe 45, throttle valve 46, passage 94 in reversing valve 47, manifold 48, pipe 49, passages 85, 87 in the distributor valve and pipe 84 to one of the engine cylinders (say 70) and, as the plug of the distributor valve rotates, to each cylinder in turn. The exhaust from another cylinder (say 70³) flows through pipe 84³, passages 88, 86 in the distributor valve, pipe 54, manifold 57 and passage 95 in the reversing valve to the main exhaust pipe 58. As the plug in the distributor valve rotates each cylinder in turn is placed in communication with the main exhaust.

A reference to Fig. 2 will show that all four engines are supplied from manifold 48, and exhaust through manifold 57.

To effect reverse running of the engines and consequently of the vehicle, the reversing valve is adjusted as shown in Fig. 19, the flow of air being as indicated by the arrows shown in full lines in this figure as will be understood.

When coasting in a forward direction and with the throttle valve 46 closed, the engines may be employed as braking means by setting the reversing valve 47 as shown in Fig. 19. The engines then act as pumps drawing air inwardly through the main exhaust pipe 58, and, the flow being as indicated by the arrows shown in dotted lines, the pressure established in manifold 57 and pipe 60 is sufficient to overcome the receiver pressure on non-return valve 61 and discharge into the receiver against the pressure therein. The braking effect may be regulated by adjusting the valve 47 to partially throttle the ingress of air through main exhaust pipe 58. Furthermore the valve 47 may be adjusted to close both pipes 48 and 57, thus locking the air-engines against rotation.

Reference will now be made to the manual and automatic control of the Diesel engine, and the automatic maintenance of sufficient air pressure in the receiver 20 and starting tank 22, and in this connection particular reference is made to Figs. 14 to 17 inclusive.

The engine 24 is started in known manner by the admission of air at high pressure from the starting tank 22 through pipe 98 which is in communication with a chamber 99. The admission of air from the starting tank to this chamber is controlled by a starting valve 100 (Fig. 15), the spindle 101 of which passes through a stuffing box 101¹ in the top of said chamber and is terminally connected to an operating lever 102 pivoted at one end at 103 to a bracket 104 on the engine crankcase. About the spindle is a spring 105 normally closing the valve on its seat.

Fitted in the top of the receiver 20 is a cylinder 106 in which is a cup-shaped flexible diaphragm 107 closed at the top by a cover plate 108 with vent holes 109. The bottom of the diaphragm 107 is clamped between two plates 110, 110¹ on a spindle 111 which passes upwardly through the cover 108 and is connected by a flexible medium 112 to the end of lever 102 remote from its pivot. About the spindle 111 is a coil spring 113 bearing at one end on plate 110 and at the other end against a head 114 adjustably secured by studs 115 fitted with locknuts. This spring urges the bottom of the diaphragm downwardly against the pressure of the air in the receiver 20, the spring tension being adjusted to balance the normal working air pressure.

The oil-fuel supply is controlled by a rotary valve 37 in pipe 36, and this itself is automatically controlled by the pressure in the receiver 20 by means as illustrated in Fig. 17, and similar to that just previously described in relation to the starting valve 100. The lever of valve 37 is connected by rod 117 to the stem or spindle 118 secured to the bottom of a cup-shaped flexible diaphragm 119 housed in a cylinder 120 fitted in the top of receiver 20 and provided with a cover 121. The bottom of the diaphragm is urged in a downward direction by a spring 122 in opposition to the air pressure in the receiver. Should the pressure in the receiver at any time be less than sufficient to resist the spring tension, the latter moves the diaphragm downwardly and by so doing opens the oil fuel control valve 37 so that the engine may be started as hereinafter explained.

The automatic re-establishment of the necessary air pressure in the starting tank, should said pressure, for any reason or from any cause, fall below a set minimum, is effected by means illustrated in Fig. 16 and similar to the automatic means described in relation to the starting valve and the oil-fuel control valve. For this purpose there is provided in the receiver 20 a chamber 125 in communication with the receiver through a valve 126 normally closed to its seat by a spring 127 disposed about the valve spindle 128 and bearing at one end against the top of the receiver and at the other end against a collar 129 on the spindle. Said chamber is also in communication through the pipe 34 (see Figs. 2 and 14) with the air engine 33 driving the air pump 31 which delivers into the starting tank through pipe 32.

A lever 130 pivoted at one end to a bracket 131 bears upon the stem 128 of valve 126, and at its other end is connected to the stem or spindle 132 of a cup-shaped diaphragm 132¹ housed in a cylinder 133 mounted on the starting tank 22 and exposed on its under side to the pressure existing in said starting tank. Within the cylinder which is fitted with a cover 134 is a spring 135, the tension of which is adjusted to exert a downward pressure on the diaphragm less than the upward normal working pressure exerted by the air. Should the air pressure in the starting tank fall below a set minimum, the downward movement of the bottom of the diaphragm due to excess spring pressure will pull down the lever 130 and open valve 126, thus admitting air from the receiver 20 to chamber 125 and thence through pipe 34 to the air engine 33.

When the normal working pressure in starting tank 22 is restored, this pressure overcomes that of the spring 135 and the valve 126 is closed.

To initially start the compressor unit it is necessary that the required air pressure be established in the starting tank 22, and this is effected by the electrical operation of air pump 26. The starting valve 100 is opened by manual depression of lever 102, thus admitting high pressure starting air to the engine 24, and as at this stage there is no pressure in receiver 20 the oil fuel valve 37 is open and oil fuel is supplied to the engine. As soon as the engine commences to function normally, the lever 102 is released.

The operation of the compressor unit gradually establishes the required pressure in the receiver 20, and when the predetermined maximum is attained, the pressure acting on diaphragm 119 overcomes the tension of spring 122 and closes the oil-fuel valve thus stopping the engine 24.

Should the pressure in receiver 20 be reduced below a set minimum, the air compressor unit is automatically restarted. This is effected by the tension of spring 113 which overcomes the reduced air pressure on diaphragm 107, and moves the latter in a direction to pull down lever 102 and open the starting valve 100. At the same time the oil-fuel valve 37 is automatically re-opened by the action of spring 122.

There is thus a cycle of operations whereby the required air pressure in receiver 20 is automatically maintained, it being a necessary corollary that the capacity of the air compressor unit is sufficient to meet the maximum demand for air at all times.

What I claim and desire to secure by Letters Patent is:

1. An automotive vehicle including an internal combustion air-compressor unit, an air receiver incorporated in the vehicle structure and charged by the compressor unit, means for initially starting the compressor unit, means controlled by the pressure in the receiver for automatically stopping the compressor unit when a predetermined pressure has been attained, means for automatically re-starting the compressor unit on reduction, below normal, of the pressure in the receiver, air engines of radial cylinder type coupled respectively to the driving wheels of the vehicle and actuated by air from the receiver, a throttle valve regulating the supply of air to said engines, and control means for directing the air flow through the air-engines in either direction for forward or reverse drive selectively.

2. An automotive vehicle according to claim 1 hereof, further characterized in that the driving wheels are mounted directly on the crankshafts of the air-engines respectively and the air-engines are attached to resilient supports of the vehicle body.

3. An automotive four-wheeled vehicle according to claim 1 hereof, further characterized in that four air-engines of fixed radial cylinder type are coupled respectively to the four wheels of the vehicle, to constitute a four wheel drive, and each front engine-and-wheel assembly is mounted on a steering knuckle.

4. An automotive vehicle according to claim 1 hereof, further characterized in that the receiver constitutes the chassis.

5. An automotive vehicle according to claim 1 hereof, further characterized in that the receiver constitutes the chassis, the air-engines are mounted respectively on the ends of resiliently supported arms pivoted to the receiver structure, and the driving wheels respectively are mounted on the crankshafts of the air-engines, said crankshafts serving as stub-axles for the wheels.

6. In an automotive vehicle in which the driving wheels respectively are rotated by air-engines supplied with air under pressure from a receiver incorporated in the vehicle structure, and in which the said wheels are mounted upon the crankshafts of the engines respectively, lever arms associated respectively with each engine and wheel assembly, each of said arms being pivoted at one end to the receiver structure, at the other end connected to one of the air engines and intermedially supported by a pneumatic cushioning device attached to the receiver structure, said pneumatic cushioning device being supplied with air from said receiver.

7. In an automotive vehicle according to claim 1 hereof, means for enabling the engines to act as brakes when the vehicle is coasting, said means comprising a connection between the exhaust pipes of the air engines and the receiver, in said connection a non-return valve normally closed by the pressure in the receiver, and a valve adjustable to connect the inlet pipes of the air engines to atmosphere, to obstruct the escape of air from the exhaust pipes of the engines to atmosphere and direct it through said non-return valve into the receiver.

8. An automotive wheeled vehicle, including an air-compressor unit operating on the Diesel principle, a main receiver incorporated in the vehicle structure and charged by said compressor, a starting tank to contain high pressure air for starting the compressor unit, means for initially charging the starting tank, a spring-closed starting valve to control the flow of air from the starting tank to the compressor unit, means for manually operating the starting valve, means controlled by the air pressure in the main receiver to automatically open the starting valve on reduction below a set minimum of the pressure in the main receiver, an air pump actuated by compressed air from the main receiver for charging the starting tank, means controlled by the pressure in the starting tank for automatically opening a valve to admit air to actuate said air pump when the pressure in the starting tank is below a set minimum, air engines coupled respectively to the driving wheels of the vehicle and actuated by air from the main receiver, a throttle valve regulating the supply of air to said engines, and means for directing the flow of air through the engines for forward or reverse drive.

9. An automotive vehicle according to claim 1 hereof, in which the control means consists of a valve comprising a casing having an inlet port connected to the air receiver, a port connected to atmosphere, a port connected to the normal air inlet pipes of all the engines and a port connected to the normal exhaust pipes of all the engines, and an adjustable element for establishing communication between the receiver and the normal inlet pipes of the engines and the normal exhaust pipes of the engines and atmosphere for forward drive, and, for reverse drive, between the receiver and said normal exhaust pipes and between the said normal inlet pipes and atmosphere.

FREDRICK ALFRED EDWARD JENKINS.